United States Patent
Xu (10) Patent No.: US 11,200,547 B2
(45) Date of Patent: Dec. 14, 2021

(54) PAYMENT COLLECTION CONTROL METHOD AND DEVICE, SERVER, AND COMPUTER-READABLE STORAGE MEDIUM

(71) Applicant: Advanced New Technologies Co., Ltd., Grand Cayman (KY)

(72) Inventor: Jingwei Xu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/086,192

(22) Filed: Oct. 30, 2020

(65) Prior Publication Data
US 2021/0049564 A1 Feb. 18, 2021

Related U.S. Application Data

(63) Continuation of application No. PCT/CN2019/089036, filed on May 29, 2019.

(30) Foreign Application Priority Data

Aug. 13, 2018 (CN) .......................... 201810916993.5

(51) Int. Cl.
*G06Q 20/08* (2012.01)
*G06F 16/9038* (2019.01)
(Continued)

(52) U.S. Cl.
CPC ....... *G06Q 20/085* (2013.01); *G06F 16/9035* (2019.01); *G06F 16/9038* (2019.01); *G06Q 20/0655* (2013.01); *G06Q 20/16* (2013.01)

(58) Field of Classification Search
CPC .. G06Q 20/085; G06Q 20/0655; G06Q 20/16; G06F 16/9038; G06F 16/9035
See application file for complete search history.

(56) References Cited

U.S. PATENT DOCUMENTS

| 6,879,691 B1* | 4/2005 | Koretz | G06F 40/174 380/255 |
| 8,370,349 B2* | 2/2013 | Quoc | G06Q 10/10 707/732 |

(Continued)

FOREIGN PATENT DOCUMENTS

| CN | 104717340 | 6/2015 |
| CN | 104636921 | 12/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Mark D Featherstone
*Assistant Examiner* — Navneet Gmahl
(74) *Attorney, Agent, or Firm* — Fish & Richardson P.C.

(57) ABSTRACT

A method performed by one or more computers includes obtaining a collection order initiated by a user; determining a quantity of payers for the collection order; determining whether the user selects to invoke a one-click friends list, and if so, generating, a one-click friends list corresponding to the quantity of payers, wherein the one-click friends list is determined by collecting and analyzing cumulative behavioral data of the user based on historical collection orders of the user within a predetermined time period; and receiving user input from the user to determine that the one-click friends list matches an actual friends list for the collection order, and in response, initiating collection corresponding to the collection order.

20 Claims, 6 Drawing Sheets

(51) Int. Cl.
*G06F 16/9035* (2019.01)
*G06Q 20/16* (2012.01)
*G06Q 20/06* (2012.01)

(56) References Cited

U.S. PATENT DOCUMENTS

| | | | |
|---|---|---|---|
| 8,495,020 B1* | 7/2013 | Nasserbakht | G06F 15/7807 707/640 |
| 9,710,134 B1* | 7/2017 | Russell | H04M 1/2746 |
| 9,830,597 B2* | 11/2017 | Bondesen | G06Q 20/385 |
| 9,922,094 B1* | 3/2018 | Perumal | H04W 4/029 |
| 2004/0054592 A1* | 3/2004 | Hernblad | G06Q 50/12 705/15 |
| 2006/0031510 A1* | 2/2006 | Beck | H04L 67/327 709/226 |
| 2006/0035632 A1* | 2/2006 | Sorvari | H04M 1/72547 455/418 |
| 2009/0083299 A1* | 3/2009 | Chen | G06Q 10/107 |
| 2009/0319425 A1* | 12/2009 | Tumminaro | G06Q 20/3223 705/42 |
| 2011/0171934 A1* | 7/2011 | Lim | H04M 1/72427 455/412.1 |
| 2011/0246404 A1* | 10/2011 | Lehmann | G06Q 50/14 706/21 |
| 2012/0015624 A1* | 1/2012 | Scott | G06F 9/451 455/405 |
| 2012/0173396 A1 | 7/2012 | Melby et al. | |
| 2012/0331418 A1* | 12/2012 | Bonforte | G06Q 50/01 715/784 |
| 2013/0054413 A1* | 2/2013 | Brendell | G06Q 20/3276 705/26.41 |
| 2013/0085931 A1 | 4/2013 | Runyan | |
| 2013/0159173 A1* | 6/2013 | Sivaraman | G06Q 20/322 705/39 |
| 2014/0143361 A1* | 5/2014 | Gestsson | H04L 51/36 709/206 |
| 2014/0173959 A1* | 6/2014 | Kountotsis | F41A 17/063 42/1.02 |
| 2014/0241216 A1* | 8/2014 | Cheng | H04M 3/436 370/271 |
| 2014/0279098 A1* | 9/2014 | Ham | G06Q 20/102 705/16 |
| 2015/0040027 A1* | 2/2015 | Cheng | G06F 3/0488 715/747 |
| 2015/0126149 A1* | 5/2015 | Zhang | H04W 8/183 455/405 |
| 2015/0142661 A1* | 5/2015 | Jain | G06Q 20/10 705/44 |
| 2015/0156149 A1* | 6/2015 | Keith | H04L 51/08 709/206 |
| 2015/0188851 A1* | 7/2015 | Tomkins | H04L 51/00 709/206 |
| 2015/0348045 A1* | 12/2015 | Agarwal | G06Q 20/384 705/44 |
| 2016/0063459 A1* | 3/2016 | Li | G06Q 20/10 705/39 |
| 2016/0078471 A1* | 3/2016 | Hamedi | H04L 67/1072 705/14.41 |
| 2016/0150063 A1* | 5/2016 | Choi | H04M 1/7253 455/414.1 |
| 2016/0239838 A1* | 8/2016 | Yang | G06Q 20/384 |
| 2017/0186015 A1* | 6/2017 | Jin | G06Q 20/321 |
| 2017/0228127 A1* | 8/2017 | Mukherjee | G06F 9/542 |
| 2017/0318021 A1* | 11/2017 | Chaudhry | H04L 63/102 |
| 2018/0096324 A1* | 4/2018 | Chen | G06Q 20/16 |
| 2018/0365675 A1* | 12/2018 | Sivaraman | G06Q 20/3223 |
| 2019/0018848 A1* | 1/2019 | Lee | G06F 16/24578 |
| 2019/0205862 A1* | 7/2019 | Xu | G06Q 20/22 |
| 2019/0279317 A1* | 9/2019 | Burton | H04L 51/16 |
| 2020/0036451 A1* | 1/2020 | Gilson | H04M 19/04 |
| 2020/0159777 A1* | 5/2020 | Weldemariam | H04L 67/306 |
| 2020/0334724 A1* | 10/2020 | Garrett | H04L 67/1061 |

FOREIGN PATENT DOCUMENTS

| | | |
|---|---|---|
| CN | 106296158 | 1/2017 |
| CN | 106330657 | 1/2017 |
| CN | 106651336 | 5/2017 |
| CN | 106682890 | 5/2017 |
| CN | 106686030 | 5/2017 |
| CN | 107045540 | 8/2017 |
| CN | 107404500 | 11/2017 |
| CN | 109345219 | 2/2019 |
| TW | M548302 | 9/2017 |
| WO | WO 2016086799 | 6/2016 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/089036, dated Aug. 20, 2019, 11 pages (with partial English translation).
PCT International Preliminary Report on Patentability in International Application No. PCT/CN2019/089036, dated Feb. 16, 2021, 11 pages (with partial English translation).
EP Extended Search Report in European Application No. 19850319.5, dated Jul. 6, 2021, 10 pages.

* cited by examiner

PAYMENT COLLECTION CONTROL METHOD AND DEVICE, SERVER, AND COMPUTER-READABLE STORAGE MEDIUM

CROSS-REFERENCE TO RELATED APPLICATIONS

This application is a continuation of PCT Application No. PCT/CN2019/089036, filed on May 29, 2019, which claims priority to Chinese Patent Application No. 201810916993.5, filed on Aug. 13, 2018, and each application is hereby incorporated by reference in its entirety.

TECHNICAL FIELD

Embodiments of the present application relate to the field of Internet technologies, and in particular, to a payment collection control method and device, a server, and a computer-readable storage medium.

BACKGROUND

With the development of Internet-based finance, Internet-based collection becomes increasingly popular. How to effectively control the collection process is a technical problem to be considered in network finance.

SUMMARY

Embodiments of the present application provide a payment collection control method and device, a server, and a computer-readable storage medium.

According to a first aspect, the embodiments of the present application provide a payment collection control method for controlling selection of friends to share a cost, including: obtaining a collection order initiated by a user, and determining the quantity of payers; determining whether a user selects to invoke a one-click friends list, and if so, generating a one-click friends list corresponding to the quantity of payers, where the one-click friends list is determined by collecting and analyzing the cumulative behavioral data of the user based on the historical collection orders of the user within a predetermined time period; and interacting with the user to determine whether the one-click friends list matches the friends list for the current collection order, and if so, initiating the collection, or if not, adjusting the friends list and then initiating the collection. In this specification, sharing being described as "equal" sharing is a shorthand meaning that the amounts shared by the participants are substantially equal. Thus, an "equal-share" does not require that the amounts paid by the participants match precisely. In addition, the techniques described in this specification can also be used to share amounts that are not substantially equal as well as amounts that differ substantially.

According to a second aspect, the embodiments of the present application provide a payment collection control device for controlling selection of friends for an equal-share collection, and the device includes an equal-share collection determining unit, a one-click equal-share friend invoking unit, an equal-share friends list adjustment unit, and a collection unit, where: the equal-share collection determining unit is configured to obtain an equal-share collection order initiated by a user, and determine the quantity of payers; the one-click equal-share friend invoking unit is configured to generate a one-click equal-share friends list corresponding to the quantity of payers when the user invokes the one-click equal-share friends, where the one-click equal-share friends list is determined by collecting and analyzing cumulative behavioral data of the user based on the historical equal-share collection orders of the user within a predetermined time period; and the equal-share friends list adjustment unit is configured to interact with the user to determine whether the one-click equal-share friends list matches the friends list for the current collection order, and if so, instruct the collection unit to initiate the collection, or if not, adjust the friends list and then instruct the collection unit to initiate the collection.

According to a third aspect, the embodiments of the present application provide a server, including a memory, a processor, and a computer program that is stored in the memory and can be run on the processor, where when the processor executes the computer program, the method according to any one of the previous aspects is implemented.

According to a fourth aspect, the embodiments of the present application provide a computer computer-readable storage medium, where the medium stores a computer program, and when the computer program is executed by a processor, the steps of the method according to any one of the previous aspects are implemented.

The beneficial effects of the embodiments of the present application are as follows:

According to the payment collection control method provided in some embodiments of the present application, the friend selections for equal share of payment, which may be referred to as Average Amount (AA) collection, prevent the user from repeatedly selecting the AA collection friends manually, a one-click AA collection order is automatically generated for the user based on the result of analyzing big data, so that the AA collection friends can be quickly determined, the collection efficiency and accuracy are improved, and the user experience is improved. In addition, the friends list is optimized based on the level of participation of the friends in the AA collection, so that the user can quickly identify the friends for the AA collection.

DESCRIPTION OF EMBODIMENTS

In order that the previous technical solutions can be better understood, the following describes the technical solutions of the embodiments of the present application with reference to the accompanying drawings and specific embodiments of the present application. It should be understood that specific features of the technical solutions of the embodiments of the present application are described in detail, rather than limiting the technical solutions of the present application; and the technical features of the embodiments of the present application and the embodiments can be combined with each other when no conflict occurs.

Figure 1:
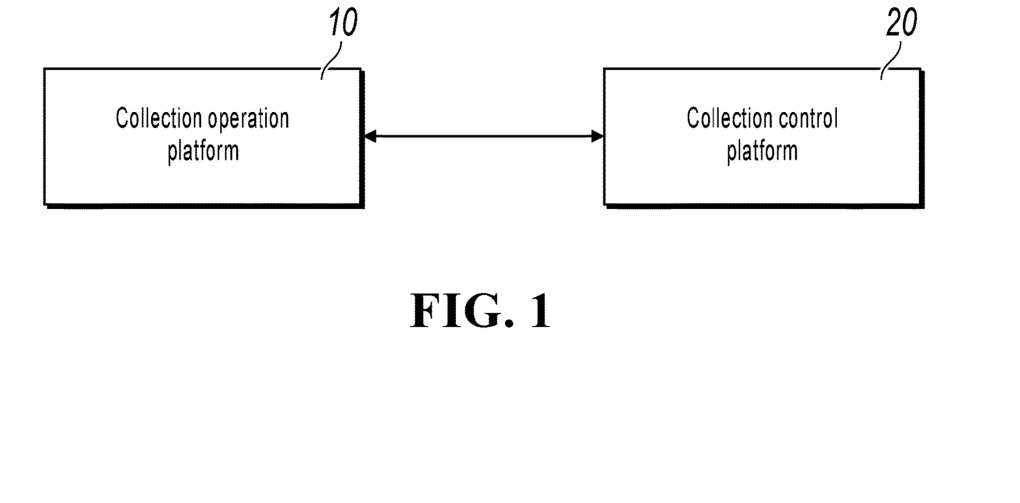
FIG. 1 is a schematic diagram illustrating a scenario of a payment collection control method, according to embodiments of the present application.

FIG. 1 is a schematic diagram illustrating a scenario of a payment collection control method, according to embodiments of the present application. The scenario includes a collection operation platform 10 and a payment collection control platform 20. The collection operation platform 10 can be a platform provided by a financial APP or an instant messaging APP, and it can be understood that the collection operation platform 10 is typically located at a user terminal (for example, a smartphone or pad). The payment collection control platform 20 is a module for controlling the collection operation platform 10. The payment collection control platform 20 can be integrated with a financial APP or an instant messaging APP (that is, also located at a user terminal) or can be located at a server. In some embodiments of the present application, in particular, the equal-share collection (equal-share collection or AA collection) is controlled, that is, the payment collection control platform 20 performs quick matching on the collection operation platform 10 on selection of the equal-share friends, thereby improving the efficiency of the entire equal-share collection.

Figure 2:
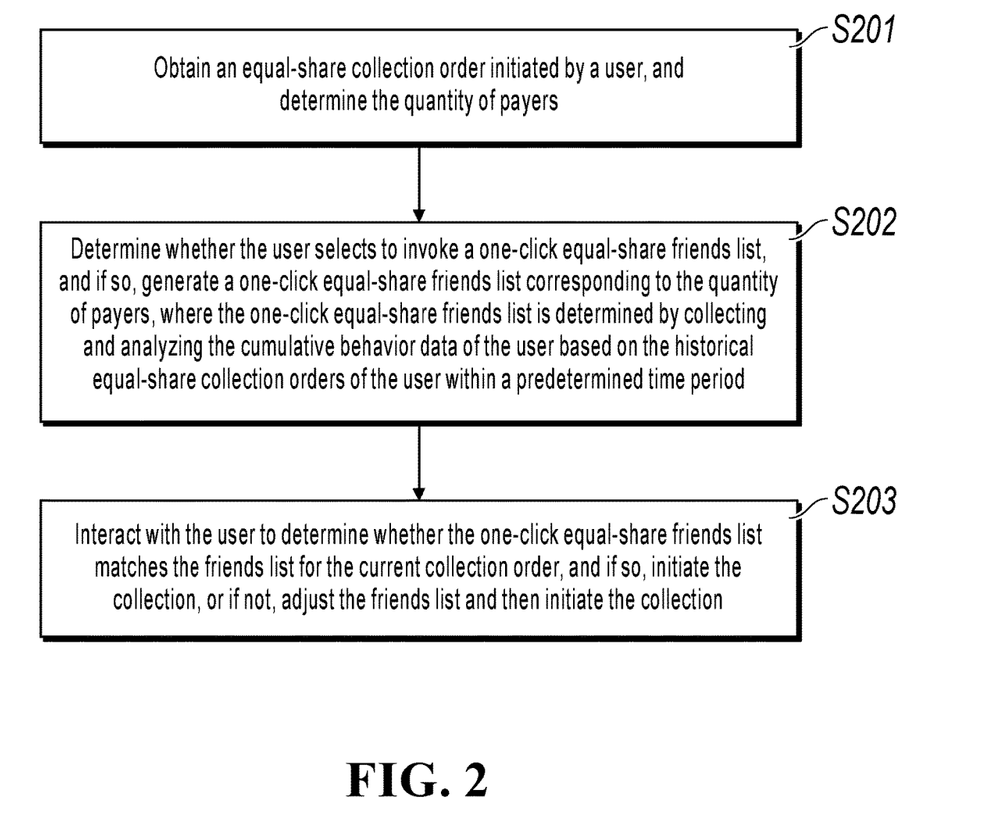
FIG. 2 is a flowchart illustrating a payment collection control method, according to a first aspect of the embodiments of the present application.

According to a first aspect, the embodiments of the present application provide a payment collection control method for controlling selection of friends for an equal-share collection. Referring to FIG. 2, the method includes:

S201: Obtain an equal-share collection order initiated by a user, and determine the quantity of payers.

AA collection means that a plurality of payers equally share the required expenses, which is also referred to as equal-share collection in some embodiments of the present application. For example, a typical example of the AA collection is that several friends travel together, and the travel expenses are shared equally by the friends after the travel is completed.

At present, many instant messaging or financial APPs provide the AA collection function. After the user enters the AA collection interface, the user enters the collection amount and the quantity of payers (or the collection reason/details). The APP can automatically calculate the amount of the expenses to be equally paid by each payer, but cannot automatically determine the friends of the AA collection. If the user manually selects friends one by one, it is cumbersome.

S202: Determine whether the user selects to invoke a one-click equal-share friends list, and if so, generate a one-click equal-share friends list corresponding to the quantity of payers, where the one-click equal-share friends list is determined by collecting and analyzing the cumulative behavioral data of the user based on the historical equal-share collection orders of the user within a predetermined time period.

In some embodiments of the present application, the function of "one-click equal-share friends list" is added to the payment collection control platform 20 (see FIG. 1), so that the user does not need to manually add the AA collection friends one by one, but can invoke the AA collection friends through one click.

The function of the one-click equal-share friends list is used to determine a one-click equal-share friends list that is consistent with the quantity of the payers for the current AA collection by collecting and analyzing the cumulative behavioral data of the user based on the historical equal-share collection orders of the user within a predetermined time period.

For example, if the quantity of the payers for the current AA collection is 5 (excluding the user), the most likely five friends (for example, friends A, B, C, D, and E) can be determined by analyzing the AA collection data of the user within the last month, and the five friends can be added to the previous one-click equal-share friends list.

S203: Interact with the user to determine whether the one-click equal-share friends list matches the friends list for the current collection order, and if so, initiate the collection, or if not, adjust the friends list and then initiate the collection.

After the one-click equal-share friends list is determined, the user needs to determine whether the friends list matches the actual situation. If the one-click equal-share friends list matches the friends list for the current collection order, the collection is initiated; otherwise, the friends list needs to be adjusted before the collection is initiated.

The friends list can be adjusted in different methods.

For example, a mismatched friend is manually deleted by the user, and then a manual adjustment interface (an optimized address book) is presented to the user, and the user adds a missing friend from the optimized address book. For example, the one-click equal-share friends list includes friends A, B, C, D, and E. After the user determines that friend B does not match, the user first deletes friend B, and then selects another friend, for example, friend F, from the optimized address book, and the final equal-share friends list includes friends A, C, D, E, and F.

For another example, the one-click equal-share friends list can be regenerated by adjusting the priorities of the friends in the existing one-click equal-share friends list. For example, a one-click equal-share friends list is generally determined based on the level of equal-share participation of each friend in the historical equal-share collection orders of the user, that is, a friend with a higher level of equal-share participation (the frequency to participate in an AA collection) has a higher priority. However, in practice, the levels of equal participation of two or more friends may be very close to or similar to each other. In this case, the priorities of the friends can be adjusted to generate a one-click equal-share friends list different from the previous one. For example, the first equal-share friends list includes friends A, B, C, D, and E, and the priorities of the friends can be adjusted to generate the second equal-share friends list that includes friends A, C, D, E, and F. After the one-click equal-share friends list is regenerated, it is determined, through interaction with the user, whether the current one-click equal-share friends list matches the friends list for the current collection order; and if so, the collection is initiated, or if not, it is determined whether to regenerate or manually adjust the one-click equal-share friends list or select friends based on the optimized address book until that the equal-share friends list matches the friends list for the current collection order.

In some embodiments of the present application, the conventional friend address book can be optimized. The optimized address book is obtained based on the levels of participation of the friends in the AA collection. For example, the cumulative behavioral data of the user is collected and analyzed based on the historical equal-share collection orders within a predetermined time period, to determine the arrangement order of each friend in the optimized address book.

In the previous step S202, if the user does not select to invoke the one-click equal-share friends list, the optimized address book can be displayed to the user to determine that each friend selected by the user in the optimized address book is a friend of the current collection order. Because the optimized address book sorts the friends based on the levels of participation of the friends in the AA collection, the user can quickly identify the payers of the AA collection.

Figure 3:
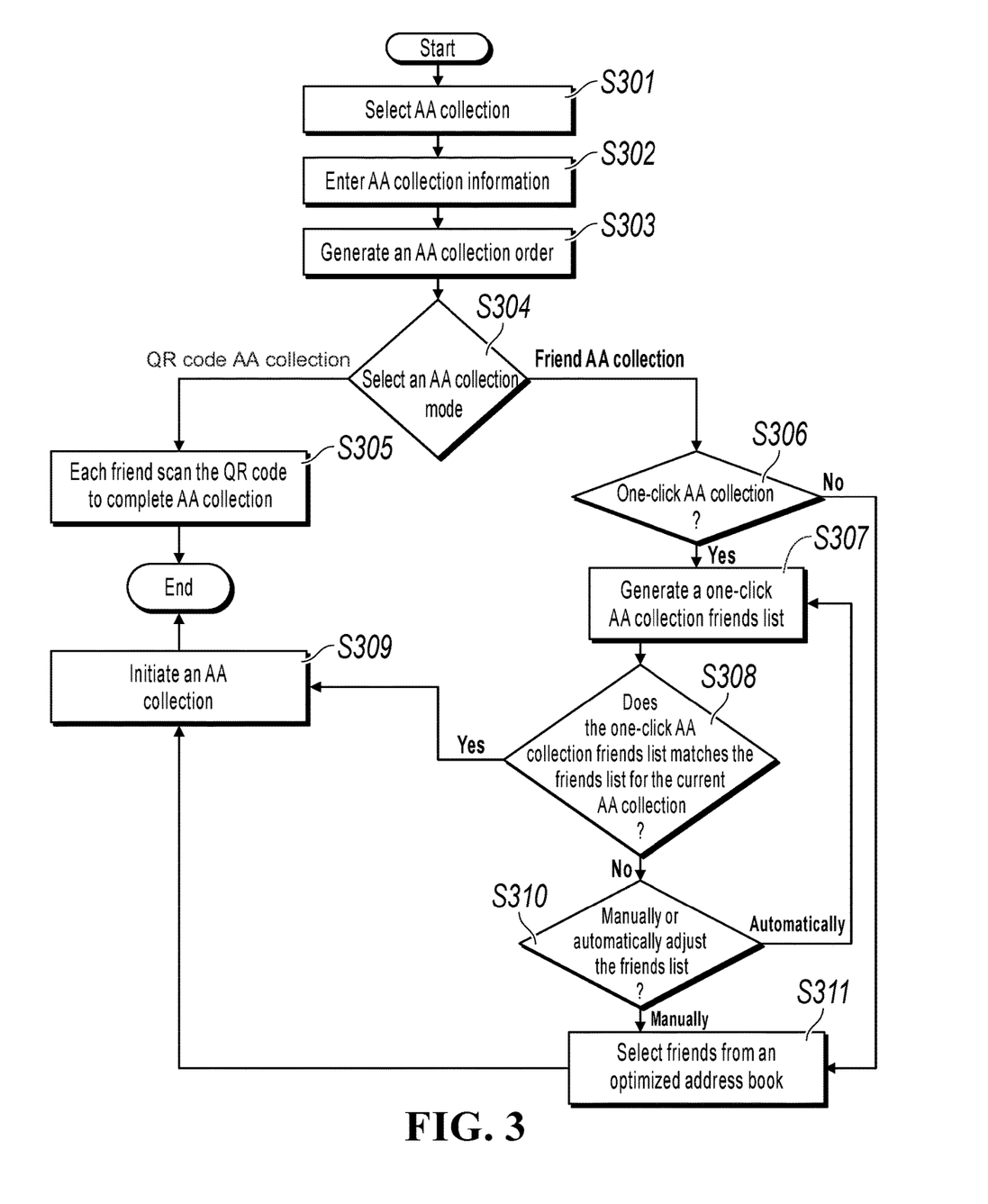
FIG. 3 is a flowchart illustrating an example payment collection control method, according to the first aspect of the embodiments of the present application.

FIG. 3 is a flowchart illustrating an example payment collection control method, according to the first aspect of the embodiments of the present application. In this example, each step of the AA collection is provided in detail, and the implementation process of the one-click equal-share friends list and the implementation process of the optimized address book are described in detail.

The process in FIG. 3 includes following steps:

S301: The user enters the APP and selects the AA collection.

S302: The user enters information related to the AA collection order, such as a total amount, a total quantity of payers, and a collection reason. The quantity of payers entered by the user generally includes the user, so as to calculate the amount of the expenses to be equally paid by each payer. However, the quantity of payers in some embodiments of the present application does not include the user.

S303. The AA collection order (collection QR code) is generated, and the amount of the expenses to be equally paid by each payer is determined, for example, by dividing the total amount by the total quantity of payers.

S304: The user selects an AA collection mode, for example, the AA collection mode includes two types: QR code AA collection and a friends AA collection. The QR code AA collection means that each friend can scan the QR code in person to complete the payment. The friend AA collection is the method of determining friends that is described in some embodiments of the present application; this method does not require that each friend is with the user, and is particularly suitable for a situation in which the friend is not present. For the QR code AA collection, S305 is performed; for the friend AA collection, S306 is performed.

S305: Each friend scans the QR code, and then the AA collection process is completed.

S306: Determine whether the AA collection mode is the one-click friends AA collection; and if so, perform S307, or if not, perform S311.

S307: Generate a one-click AA collection friends list.

S308: Determine whether the one-click AA collection friends list matches the friends list for the current AA collection; and if so, S309 is performed, or if not, S310 is performed.

S309: Initiate the AA collection, and then complete the AA collection process.

S310: Determine whether to manually or automatically adjust the friends list? If the friends list needs to be manually adjusted, S311 is performed; or if the friends list needs to be automatically adjusted, S307 is performed again to regenerate a one-click AA collection friends list.

S311: Select a friend from the optimized address book, and then perform S309.

The following describes the one-click AA collection and optimized address book in more detail.

[One-Click AA Collection]

User behavioral accumulation is to record daily detailed behaviors of a user in daily life. AA collection is used as an example, each time a user initiates an AA collection, the quantity of AA collections made by the user (accumulation subject) in the list increases by 1; and each time a friend participates in the AA collection, the quantity of AA collections the user (accumulation subject) and the friend (accumulation object) has participated in increase by 1.

A simple example is described below.

The user initiated an AA collection one month ago, and the payers include A, B, C, D, and E;

The user initiated an AA collection ten days ago, and the payers include E, F, and G;

The user initiated an AA collection seven days ago, and the payer is B;

The user initiated an AA collection five days ago, and the payers include C and G;

The user initiated an AA collection two days ago, and the payers include A, B, C, D, E, F, G, and H;

The user initiated an AA collection yesterday, and the payers include B and X;

The user initiates an AA collection today, and the payers include A, B, C, D, and E.

Then, it can be calculated that the AA collection information accumulation table of the user (for example, Mike) is shown in Table 1.

TABLE 1

| Accumulation target | Accumulation count | Last accumulation time |
| --- | --- | --- |
| A | 3 | Today |
| B | 5 | Today |
| C | 4 | Today |
| D | 3 | Today |
| E | 4 | Today |
| F | 2 | Two days ago |
| G | 3 | Two days ago |
| H | 1 | Two days ago |
| X | 1 | Yesterday |

Therefore, the accumulation count and the latest accumulation time of each payer can be an important indicator for determining the correlation between the target and related participants. On this basis, a plurality of variables can be added to separately define the cumulative subject, the cumulative object, the cumulative time, the cumulative method, and the like, so as to finally form a big data user behavioral accumulation system.

Figure 4:
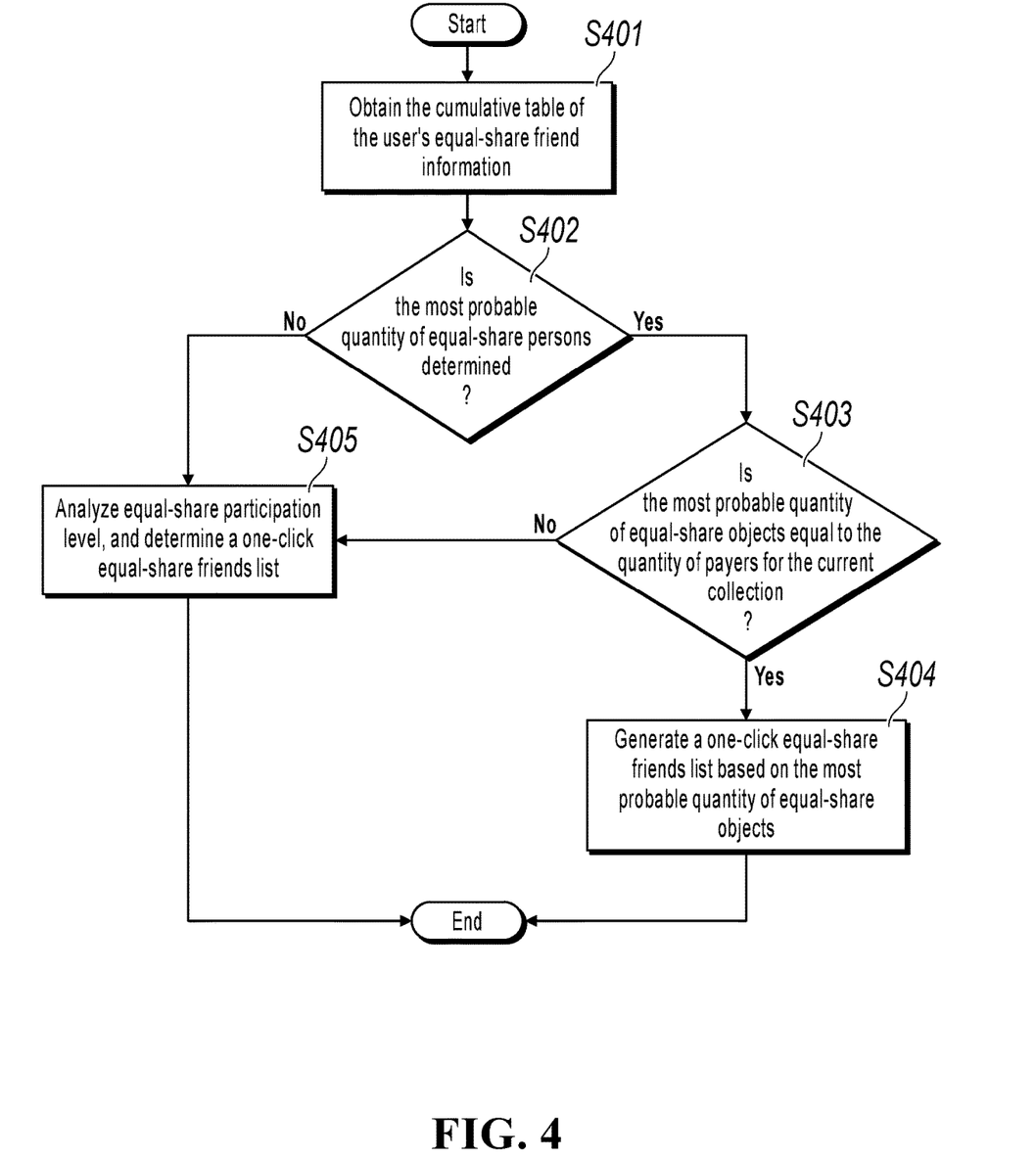
FIG. 4 is a flowchart illustrating generating a one-click equal-share friends list in the example payment collection control method, according to the first aspect of the embodiments of the present application.

In practice, a person's "friend circle (for example, dining friends) is relatively stable. An AA collection someone may initiate can be easily obtained based on the cumulative behavioral information of the user. The process is shown in FIG. 4.

S401: Collect and analyze the cumulative behavioral data of the user to obtain the cumulative table of the user's equal-share friend information (for example, Table 1).

S402: Determine whether the most probable quantity of equal-share objects whose equal-share probabilities exceed a predetermined probability threshold can be determined based on the user's equal-share friend information; and if so, perform S403, or if not, perform S405.

For example, if the most frequent AA collection combination happens over 50% of the time (the predetermined probability threshold) among all possible AA collection combinations in the last 30 days, the most probable quantity of equal-share objects is 5. If no AA collection combination happens over 50% of the time (the predetermined probability threshold), S405 is performed.

S403: Determine whether the most probable quantity of equal-share objects is equal to the quantity of the payers for the current collection order; and if so, perform S404, or if not, perform S405.

To continue with the previous example, assume that the most frequent AA collection combination in the last 30 days is a group of five, the probability of the five-person AA collection combination exceeds 50%. If the current AA collection is initiated to eight persons, the quantity of persons does not match. If the current AA collection is initiated to five persons, the quantity of persons matches, and then the five-person combination is used as the one-click equal-share friends list.

S404: Generate a one-click equal-share friends list based on each target corresponding to the most probable quantity of equal-share targets.

S405: Counting the equal-share participation level of each friend in the equal-share information cumulative table, and select friends based on the quantity of payers for the current order in an descending order of the equal-share participation level as the one-click equal-share friends list.

[Optimized Address Book]

The accuracy of the one-click AA collection can be greatly improved. If the one-click AA collection is still not accurate enough, another method is provided in some embodiments of the present application: The user selects friend collection, but the friend selection interface is optimized based on the cumulative behavioral information of the user.

Figure 5:
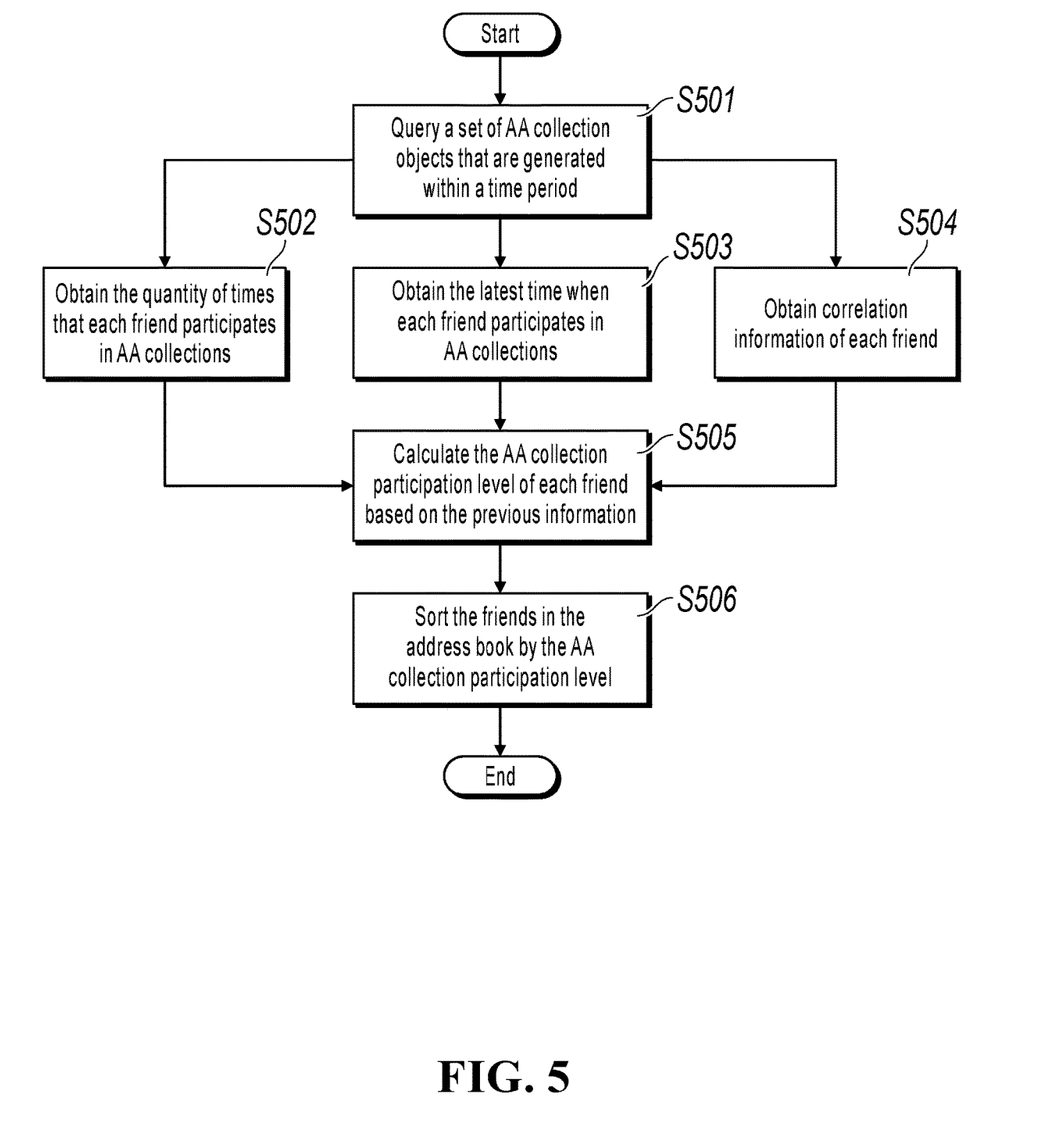
FIG. 5 is a flowchart illustrating optimizing an address book in the example payment collection control method, according to the first aspect of the embodiments of the present application.

FIG. 5 is a flowchart illustrating optimizing an address book, including:

S501: Query a set of AA collection objects that are generated within a time period (for example, 90 days);

S502: Obtain the quantity of times that each friend participates in AA collections;

S503: Obtain the latest time when each friend participates in AA collections;

S504: Obtain closeness information (for example, recent chat records) of each friend;

Here, the execution order of the S502 to S504 is not limited.

S505: Calculate the AA collection participation level of each friend based on the previous information;

S506: Sort the friends in the address book by the AA collection participation level.

An example is described below.

If the user initiates a 5-person AA collection today, the following steps are performed according to the method in some embodiments of the present description:

(1) Based on Table 1, it is found that in the last 30 days, the most frequent combination of AA subjects includes five persons: A, B, C, D, and E. This means that quantity of persons is satisfied.

(2) However, the quantity of occurrences of this combination is 2, and the total quantity of occurrences is 7; and because 2/7<50%, the condition for forming a one-click equal-share friends list is not satisfied.

(3) Based on Table 1, the five persons that are most correlated are A, B, C, D, and E;

(4) The objects included in the AA collection information output to the user are A, B, C, D, and E;

(5) After the interaction with the user, if the expectation is not met, the user clicks to select friends to initiate the AA collection.

(6) In the friend selection interface, the arrangement order of the friends is as follows: B-C-E-A-D-G-F-X-H.

It can be seen that according to the payment collection control method provided in some embodiments of the present application, because the friend selections for AA collection are similar in an actual situation, in order to prevent the user from repeatedly selecting the AA collection friends manually, a one-click AA collection order is automatically generated for the user based on the result of analyzing big data, so that the AA collection friends can be quickly determined, the collection efficiency and accuracy are improved, and the user experience is improved. In addition, the friends list is optimized based on the levels of participation of the friends in the AA collection, so that the user can quickly identify the friends for the AA collection.

Figure 6:
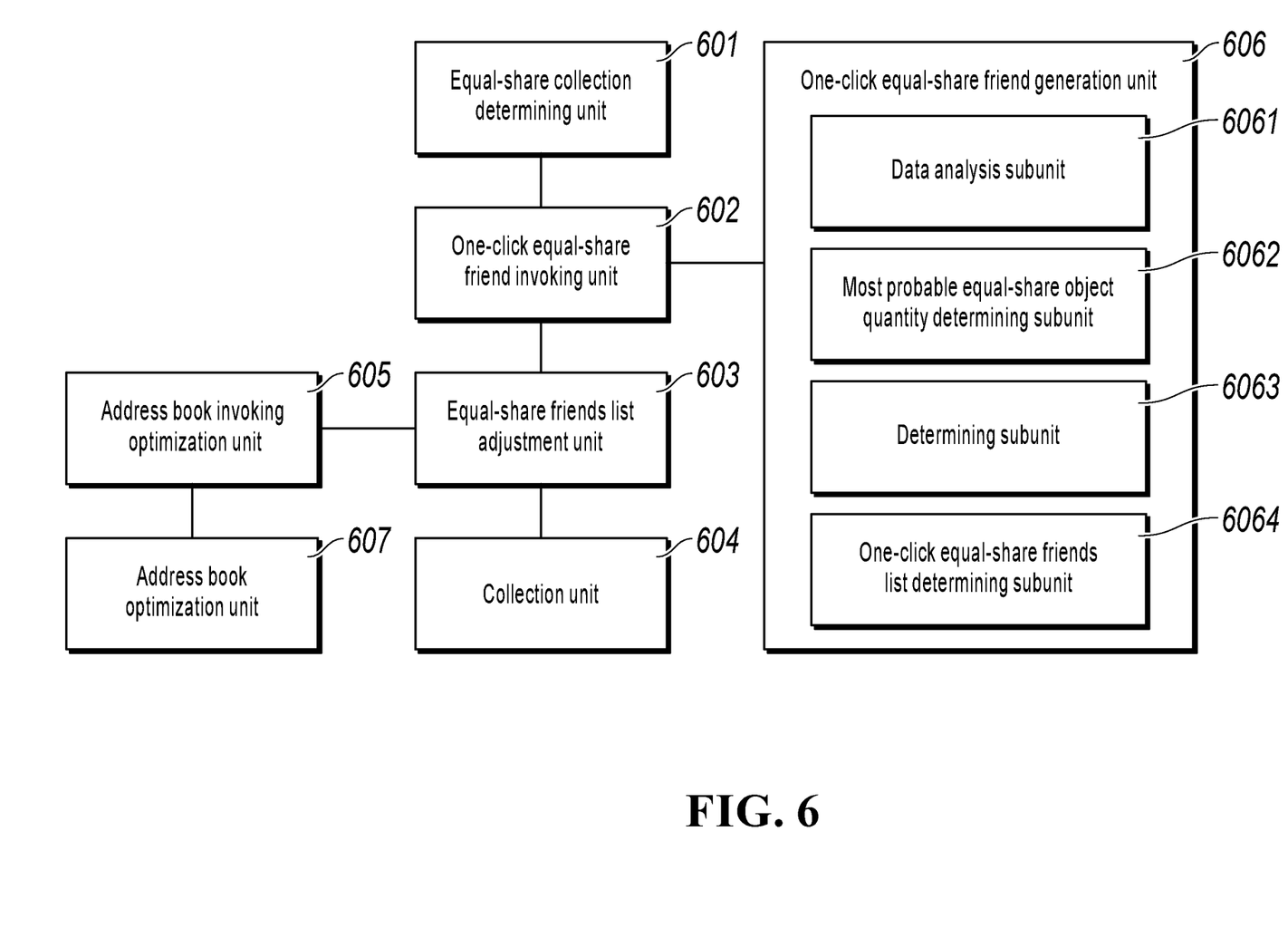
FIG. 6 is a schematic diagram illustrating a payment collection control device, according to a second aspect of the embodiments of the present application.

According to a second aspect, based on the same inventive concept, the embodiments of the present application provide a payment collection control device for controlling selection of friends for an equal-share collection. Referring to FIG. 6, the device includes an equal-share collection determining unit 601, a one-click equal-share friend invoking unit 602, an equal-share friends list adjustment unit 603, and a collection unit 604, where: the equal-share collection determining unit 601 is configured to obtain an equal-share collection order initiated by a user, and determine the quantity of payers; the one-click equal-share friend invoking unit 602 is configured to generate a one-click equal-share friends list corresponding to the quantity of payers when the user invokes the one-click equal-share friends, where the one-click equal-share friends list is determined by collecting and analyzing cumulative behavioral data of the user based on the historical equal-share collection orders of the user within a predetermined time period; and the equal-share friends list adjustment unit 603 is configured to interact with the user to determine whether the one-click equal-share friends list matches the friends list for the current collection order, and if so, instruct the collection unit 604 to initiate the collection, or if not, adjust the friends list and then instruct the collection unit 604 to initiate the collection.

Optionally, the device further includes: an address book invoking optimization unit 605, configured to display an optimized address book to the user when the user does not select to invoke the one-click equal-share friends list, where the cumulative behavioral data of the user is collected and analyzed based on the historical equal-share collection orders within a predetermined time period, to determine the arrangement order of each friend in the optimized address book; and determine each friend selected by the user in the optimized address book as a friend for the current collection order.

Optionally, the equal-share friends list adjustment unit 603 is specifically configured to display a manual adjustment interface to the user based on the one-click equal-share friends list, and obtain the friends list that is adjusted manually by the user.

Optionally, the equal-share friends list adjustment unit 603 is specifically configured to display the optimized address book to the user as the manual adjustment interface.

Optionally, the equal-share friends list adjustment unit 603 is specifically configured to regenerate a one-click equal-share friends list, where the regenerated one-click equal-share friends list is obtained by adjusting the priorities of the friends in the one-click equal-share friends list.

Optionally, the equal-share friends list adjustment unit 603 is further configured to interact with the user to determine whether the current one-click equal-share friends list matches the friends list for the current collection order; and if so, initiate the collection unit 604 to initiate the collection, or if not, determine whether to regenerate or manually adjust the one-click equal-share friends list or select friends based on the optimized address book until that the equal-share friends list matches the friends list for the current collection order.

Optionally, the method further includes a one-click equal-share friend generation unit 606.

The one-click equal-share friend generation unit 606 includes: a data analysis subunit 6061, configured to collect and analyze the cumulative behavioral data of the user to obtain a cumulative table of the user's equal-share friend information; a most probable equal-share object quantity determining subunit 6062, configured to determine the most probable quantity of equal-share objects that exceed predetermined probability threshold based on the cumulative table of the user's equal-share friend information; a determining subunit 6063, configured to determine whether the most probable quantity of equal-share objects is equal to the quantity of the payers for the current collection order; and a one-click equal-share friends list determining subunit 6064, configured to: if the most probable quantity of equal-share objects is equal to the quantity of payers for the current collection order, generate a one-click equal-share friends list based on the objects corresponding to the most probable quantity of equal-share objects; or if the most probable quantity of equal-share objects is different from the quantity of payers for the current collection order, analyze the equal-share participation level of each friend in the equal-share information cumulative table, and select friends based on the quantity of payers for the current collection order in descending order of the equal-share participation level as the one-click equal-share friends list.

Optionally, the device further includes an address book optimization unit 607, configured to: collect and analyze the cumulative behavioral data of the user to obtain a cumulative table of the user's equal-share friend information; and analyze the equal-share participation level of each friend in the equal-share information cumulative table, and determine the arrangement order of each friend in the optimized address book in descending order of the equal-share participation level.

Figure 7:
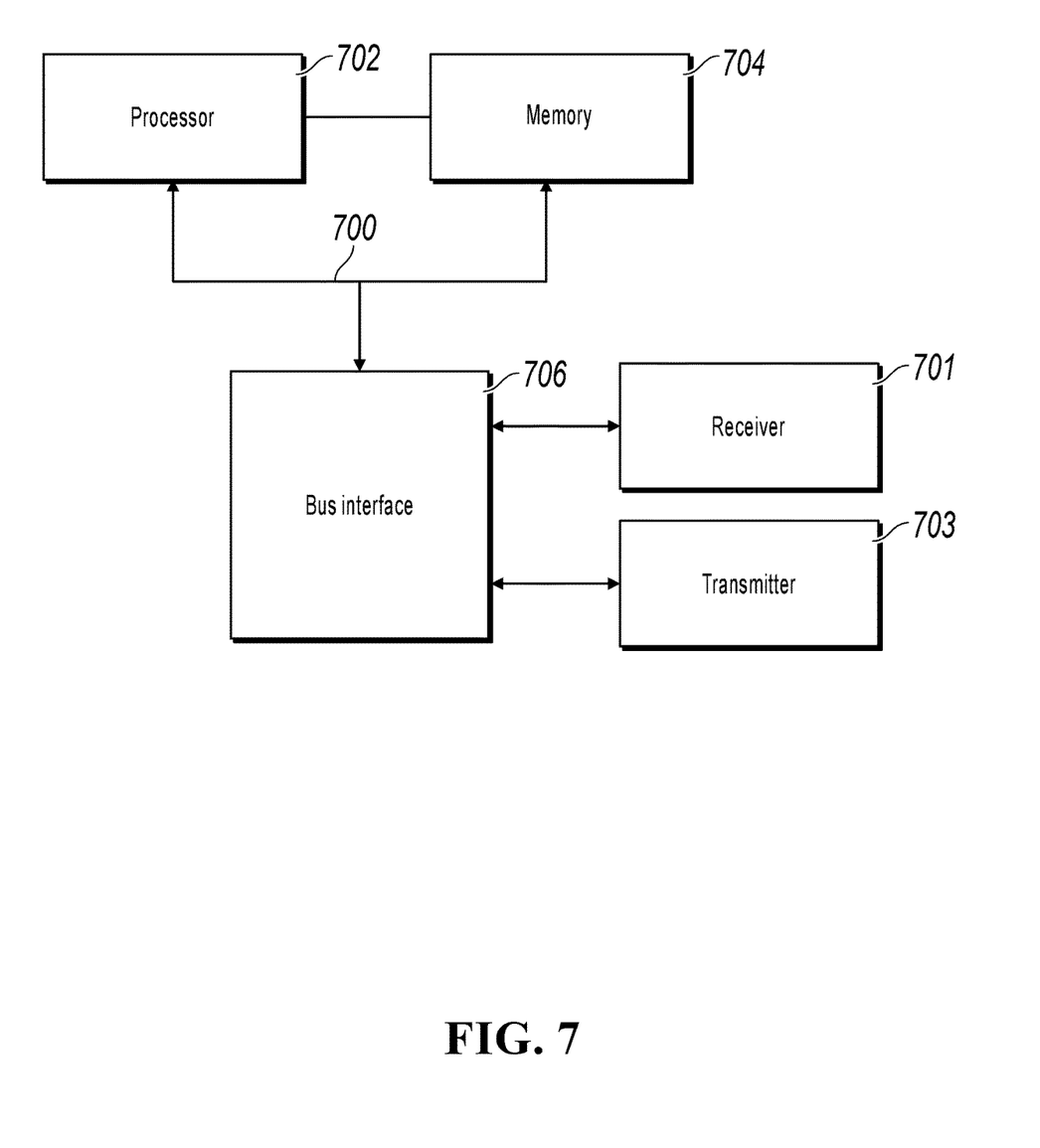
FIG. 7 is a schematic structural diagram illustrating a server, according to a third aspect of the embodiments of the present application.

According to a third aspect, based on the same inventive concept as the payment collection control method in the previous embodiments, the embodiments of the present application further provide a server. Referring to FIG. 7, the server includes a memory 704, a processor 702, and a computer program that is stored in the memory 704 and can be run on the processor 702, where when the processor 702 executes the computer program, steps of the previously described payment collection control method are implemented.

In FIG. 7, the bus architecture is represented by a bus 700. The bus 700 can include any quantity of interconnected buses and bridges. The bus 700 links various circuits of one or more processors (represented by the processor 702) and one or more memories (represented by the memory 704). The bus 700 can also link various other circuits, such as peripherals, voltage regulators, and power management circuits, all of which are well known in the art and therefore will not be described further here. The bus interface 706 provides an interface between the bus 700 and a receiver 701 and an interface between the bus 700 and a transmitter 703. The receiver 701 and the transmitter 703 can be the same element, that is, a transceiver. The receiver 701 and the transmitter 703 provide units for communicating with various other devices on the transmission medium. The processor 702 is responsible for managing the bus 700 and general processing. The memory 704 is configured to store data used by processor 702 when performing operations.

According to a fourth aspect, based on the same inventive concept as the payment collection control method in the previous embodiments, the embodiments of the present application further provide a computer computer-readable storage medium, where the medium stores a computer program, and when the computer program is executed by a processor, steps of the previously described payment collection control method are implemented.

The present application is described with reference to at least one of a flowchart or block diagram of the method, device (system), and computer program product according to the embodiments of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer computer-readable memory that can instruct the computer or the another programmable data processing device to work in a specific method, so the instructions stored in the computer computer-readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the preferred embodiments of the present application have been described, those skilled in the art will be able to make additional changes and modifications to these embodiments after understanding the basic inventive concept. Thus, the appended claims are intended to be interpreted to include the preferred embodiments and all changes and modifications that fall within the scope of the present application.

It is to be understood that those skilled in the art that various modifications and variations can be made to the present application without departing from the spirit and scope of the present application. Thus, provided that such modifications and variations of the present application are within the scope of the claims of the present application and their equivalents, the present application is intended to include such modifications and variations.

What is claimed is:

1. A method performed by one or more computers, the method comprising:
   obtaining, by a server, a collection order initiated by a user;
   determining, by the server, a quantity of payers for the collection order;
   determining, by the server, that the user selects to invoke a one-click friends list;
      determining, by the server, a most probable quantity of payers, wherein the most probable quantity of payer is a payers number, and historical collection orders are shared by payers of the payers number with a probability exceeding a predetermined probability threshold, and
         wherein the most probable quantity of payers are determined based on collecting i) and analyzing cumulative behavioral data of the user in the historical collection orders that the user participated in with one or more other payers to share a payment amount of each historical collection order and ii) within a predetermined time period;
   determining, by the server, that the most probable quantity of payers is equal to the quantity of payers for the collection order;
   in response to determining that the most probable quantity of payers is equal to the quantity of payers for the collection order, generating, by the server, the one-click friends list based on a most frequent payer combination corresponding to the most probable quantity of payers;
   receiving, by the server, user input from the user indicating that the one-click friends list matches an actual friends list for the collection order; and
   initiating, by the server, payment collection corresponding to the collection order from each friend included in the one-click friends list.

2. The method of claim 1, further comprising:
   determining that the one-click friends list does not match an actual friends list for the collection order; and
   in response to determining that the one-click friends list does not match the actual friends list for the collection order,
   adjusting the one-click friends list and then initiating the payment collection.

3. The method of claim 2, further comprising:
   displaying an optimized address book to the user when the user does not select to invoke the one-click friends list, wherein the cumulative behavioral data of the user is collected and analyzed, based on the historical collection orders within the predetermined time period, to determine an arrangement order of each friend in the optimized address book; and
   determining each friend selected by the user in the optimized address book as a friend for the collection order.

4. The method of claim 3, wherein in response to determining that the one-click friends list does not match the actual friends list for the collection order, the adjusting the one- click friends list comprises:
   displaying a manual adjustment interface to the user based on the one-click friends list; and
   obtaining a friends list that is adjusted manually by the user.

5. The method of claim 4, wherein the displaying a manual adjustment interface to the user further comprises:
   displaying the optimized address book to the user as the manual adjustment interface.

6. The method of claim 3, wherein in response to determining that the one-click friends list does not match the actual friends list for the collection order, the adjusting the one-click friends list comprises:
   regenerating a second one-click friends list, wherein the second one-click friends list is obtained by adjusting priorities of friends in the one-click friends list.

7. The method of claim 6, further comprising:
   after the second one-click friends list is regenerated, determining, through interaction with the user, whether the second one-click friends list matches the actual friends list for the collection order; and if so, initiating the payment collection, or if not, determining whether to regenerate or manually adjust the second one-click friends list or select friends based on the optimized address book until that a newly generated friends list matches the actual friends list for the collection order.

8. The method of claim 3, wherein the collecting and analyzing the cumulative behavioral data of the user to determine the arrangement order of each friend in the optimized address book comprises:
   collecting and analyzing the cumulative behavioral data of the user to obtain a cumulative table of the user's friend information;
   analyzing an participation level of each friend in the cumulative table of the user's friend information; and
   determining the arrangement order of each friend in the optimized address book in an descending order of the participation level.

9. The method of claim 1, wherein the determining the one-click friends list by collecting and analyzing the cumulative behavioral data of the user comprises:
   collecting and analyzing the cumulative behavioral data of the user to obtain a cumulative table of the user's friend information;
   determining the most probable quantity of payers that exceed predetermined probability threshold based on the cumulative table of the user's friend information; and
   determining that the most probable quantity of payers is not equal to the quantity of payers for the collection order; and
   analyzing an participation level of each friend in the cumulative table of the user's friend information, and selecting friends based on the quantity of payers for the collection order in a descending order of the participation level as the one-click friends list.

10. A non-transitory, computer-readable medium storing one or more instructions executable by a computer system to perform operations comprising:
    obtaining a collection order initiated by a user;
    determining a quantity of payers for the collection order;
    determining that the user selects to invoke a one-click friends list;
    determining a most probable quantity of payers, wherein the most probable quantity of payer is a payers number, and historical collection orders are shared by payers of the payers number with a probability exceeding a predetermined probability threshold, and
       wherein the most probable quantity of payers are determined based on collecting and analyzing cumulative behavioral data of the user in the historical collection orders i) that the user participated in with one or more other payers to share a payment amount of each historical collection order and ii) within a predetermined time period;

determining that the most probable quantity of payers is equal to the quantity of payers for the collection order;

in response to determining that the most probable quantity of payers is equal to the quantity of payers for the collection order, generating the one-click friends list based on a most frequent payer combination corresponding to the most probable quantity of payers;

receiving user input from the user indicating that the one-click friends list matches an actual friends list for the collection order; and initiating payment collection corresponding to the collection order from each friend included in the one-click friends list.

11. The non-transitory, computer-readable medium of claim 10, wherein the operations further comprise:

determining that the one-click friends list does not match an actual friends list for the collection order; and in response to determining that the one-click friends list does not match the actual friends list for the collection order, adjusting the one-click friends list and then initiating the payment collection.

12. The non-transitory, computer-readable medium of claim 11, wherein the operations further comprise:

displaying an optimized address book to the user when the user does not select to invoke the one-click friends list, wherein the cumulative behavioral data of the user is collected and analyzed, based on the historical collection orders within the predetermined time period, to determine an arrangement order of each friend in the optimized address book; and determining each friend selected by the user in the optimized address book as a friend for the collection order.

13. The non-transitory, computer-readable medium of claim 12, wherein in response to determining that the one-click friends list does not match the actual friends list for the collection order, the adjusting the one-click friends list comprises:

displaying a manual adjustment interface to the user based on the one-click friends list; and obtaining a friends list that is adjusted manually by the user.

14. The non-transitory, computer-readable medium of claim 13, wherein the displaying a manual adjustment interface to the user further comprises:

displaying the optimized address book to the user as the manual adjustment interface.

15. The non-transitory, computer-readable medium of claim 12, wherein in response to determining that the one-click friends list does not match the actual friends list for the collection order, the adjusting the one-click friends list comprises:

regenerating a second one-click friends list, wherein the second one-click friends list is obtained by adjusting priorities of friends in the one-click friends list.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining a collection order initiated by a user;
determining a quantity of payers for the collection order;

determining that the user selects to invoke a one-click friends list;

determining a most probable quantity of payers, wherein the most probable quantity of payer is a payers number, and historical collection orders are shared by payers of the payers number with a probability exceeding a predetermined probability threshold, and wherein the most probable quantity of payers are determined based on collecting and analyzing cumulative behavioral data of the user in the historical collection orders i) that the user participated in with one or more other payers to share a payment amount of each historical collection order and ii) within a predetermined time period;

determining that the most probable quantity of payers is equal to the quantity of payers for the collection order;

in response to determining that the most probable quantity of payers is equal to the quantity of payers for the collection order, generating the one-click friends list based on a most frequent payer combination corresponding to the most probable quantity of payers;

receiving user input from the user indicating that the one-click friends list matches an actual friends list for the collection order; and initiating payment collection corresponding to the collection order from each friend included in the one-click friends list.

17. The computer-implemented system of claim 16, wherein the one or more operations further comprise:

determining that the one-click friends list does not match an actual friends list for the collection order; and in response to determining that the one-click friends list does not match the actual friends list for the collection order, adjusting the one-click friends list and then initiating the payment collection.

18. The computer-implemented system of claim 17, wherein the one or more operations further comprise:

displaying an optimized address book to the user when the user does not select to invoke the one-click friends list, wherein the cumulative behavioral data of the user is collected and analyzed, based on the historical collection orders within the predetermined time period, to determine an arrangement order of each friend in the optimized address book; and determining each friend selected by the user in the optimized address book as a friend for the collection order.

19. The computer-implemented system of claim 18, wherein in response to determining that the one-click friends list does not match the actual friends list for the collection order, the adjusting the one-click friends list comprises:

displaying a manual adjustment interface to the user based on the one-click friends list; and obtaining a friends list that is adjusted manually by the user.

20. The computer-implemented system of claim 19, wherein the displaying a manual adjustment interface to the user further comprises:

displaying the optimized address book to the user as the manual adjustment interface.

* * * * *

UNITED STATES PATENT AND TRADEMARK OFFICE
CERTIFICATE OF CORRECTION

| | |
|---|---|
| PATENT NO. | : 11,200,547 B2 |
| APPLICATION NO. | : 17/086192 |
| DATED | : December 14, 2021 |
| INVENTOR(S) | : Jingwei Xu |

It is certified that error appears in the above-identified patent and that said Letters Patent is hereby corrected as shown below:

In the Claims

Column 11/Line 18 – In Claim 1, delete "collecting i)" and insert -- collecting --.

Column 11/Line 20 – In Claim 1, delete "orders" and insert -- orders i) --.

Column 11/Line 59 – In Claim 4, delete "one- click" and insert -- one-click --.

Signed and Sealed this
Third Day of May, 2022

Katherine Kelly Vidal
*Director of the United States Patent and Trademark Office*